F. W. OLDS.
WALL GAS COCK AND COUPLING.
APPLICATION FILED FEB. 18, 1916.
1,240,161. Patented Sept. 11, 1917.
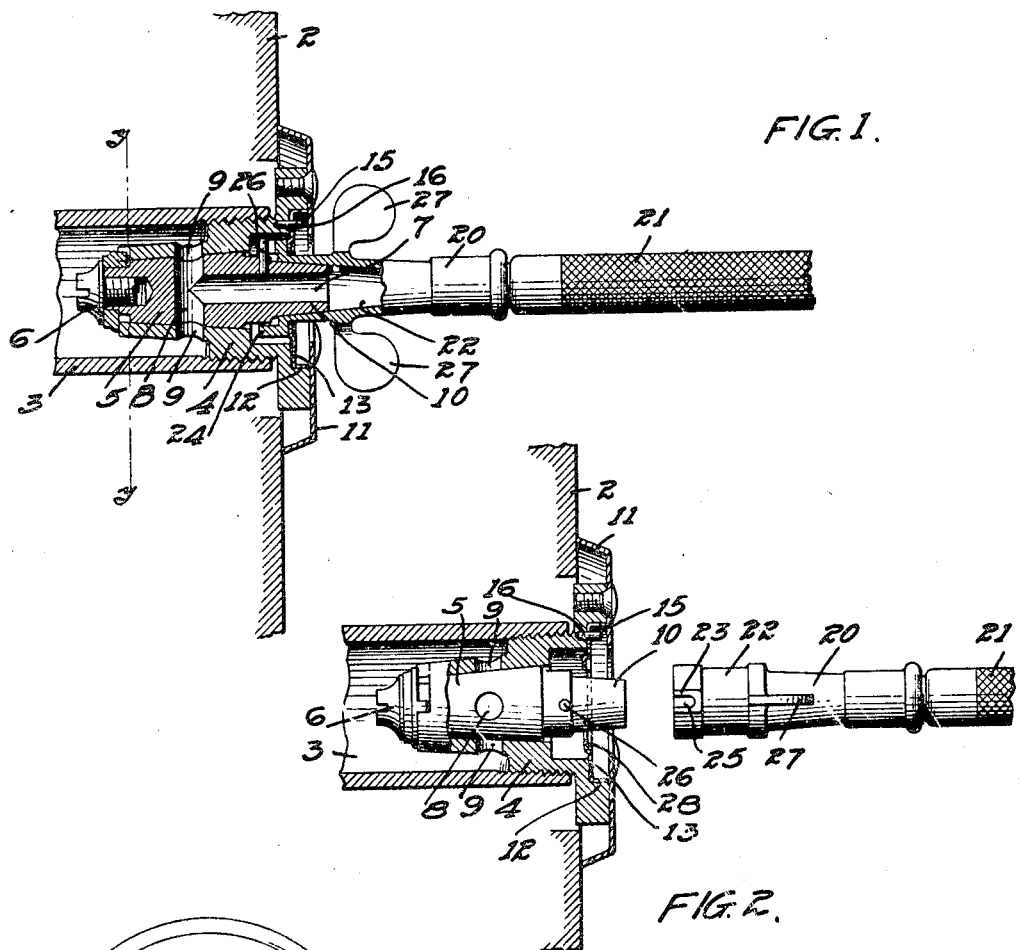
FIG. 1.
FIG. 2.
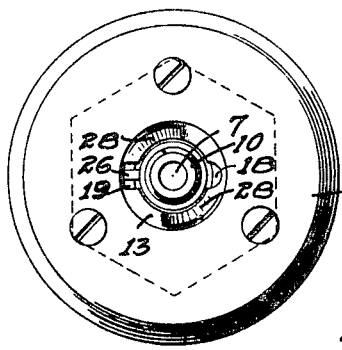
FIG. 3.
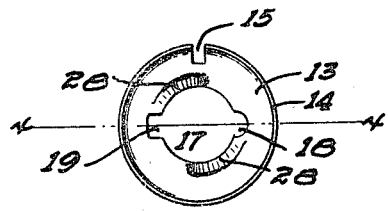
FIG. 4.
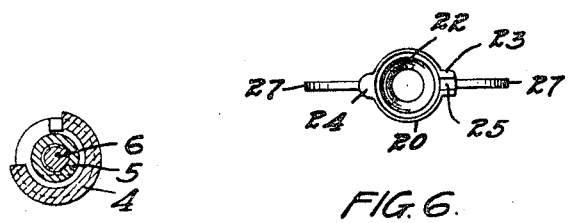
FIG. 7. FIG. 6.
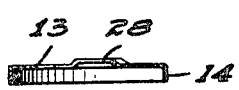
FIG. 5.
INVENTOR
FRANK W. OLDS
BY
Paul H Paul
ATTORNEYS
WITNESSES
M. P. McInnis
E. A. Paul

UNITED STATES PATENT OFFICE.

FRANK W. OLDS, OF BISMARCK, NORTH DAKOTA.

WALL GAS-COCK AND COUPLING.

1,240,161.

Specification of Letters Patent. Patented Sept. 11, 1917.

Application filed February 18, 1916. Serial No. 79,062.

*To all whom it may concern:*

Be it known that I, FRANK W. OLDS, citizen of the United States, resident of Bismarck, North Dakota, have invented certain new and useful Improvements in Wall Gas-Cocks and Couplings, of which the following is a specification.

The object of my invention is to provide improved means for connecting the tube of a gas drop light to the service pipe, the coupling being mounted in the base board or wall of the room or other convenient place for making the connection.

A further object is to provide a coupling which cannot be detached from the service pipe without closing the gas cock and thereby all danger of removing the connection and leaving the valve open is avoided.

A further object is to provide a coupling of simple, economical construction and one which will present a neat, finished appearance on the wall or the base board.

The invention consists generally in various constructions and combinations all as hereinafter described and particularly pointed out in the claims.

In the accompanying drawings forming part of this specification,

Figure 1 is a sectional view through a portion of the wall and a gas cock and coupling embodying my invention, showing the cock in its open position, Fig. 2 is a similar view, showing the members of the coupling separated and the gas cock closed, Fig. 3 is a front view of the device as it appears on the wall, Fig. 4 is a detail view of a spring washer, employed in the coupling, Fig. 5 is a sectional view on the line *x—x* of Fig. 4, Fig. 6 is a view of one member of the coupling, showing the wings for rotating the coupling to open or close the valve, Fig. 7 is a sectional view on the line *y—y* of Fig. 1.

In the drawing, 2 represents the wall of a room, 3 a gas service pipe and 4 a hollow plug tapped into the end of the service pipe and forming the shell or casing of the gas cock 5 that is conical in form, as usual in devices of this kind, and fits the tapered socket of the shell and is secured therein by a screw 6, as usual in devices of this kind. The cock is loosened or tightened in its socket by the adjustment of this screw. The cock has a longitudinal passage 7 therein communicating with a transverse passage 8 that is adapted to register with ports 9 in the wall of the shell and through these ports and through the passage the gas is allowed to flow to the passage 7 when the cock is opened. Partial rotation of the cock will move the passage 8 out of register with the ports 9 and check the flow of gas. The cock has a tapered outer end 10 projecting through an orifice in the cap 11. A recess 12 is provided in the flanged outer end of the shell 4 to receive a washer 13 having a flanged end 14 to bear on the cap 11 and provided with a peripheral slot 15, to receive a pin 16 mounted in the shell 4 for holding said washer against rotation. A central opening 17 is provided in the washer 13 and recesses 18 and 19 are provided in the edges of the opening 17 on opposite sides of the center thereof. Into this opening 17 the tapered end 10 of the gas cock projects, sufficient space being provided between the edge of the cap 11 and the edge of the opening 17 and said tapered end to allow the insertion of the coupling member therein. This member I represent by numeral 20, to one end of which the flexible tube 21 for the drop light is attached. The other end of the member has a tapered socket 22 to receive the tapered end 10 of the gas cock. Lugs 23 and 24 are provided at the inner end of the coupling member, said lug 23 having a recess 25 therein to receive a pin 26 which projects laterally from the gas cock and through which the gas cock is opened or closed when the coupling member is rotated. Wings 27 are mounted on the coupling member for convenience in operating it. The lugs 23 and 24 are positioned to bear on cam surfaces 28 provided on the washer 13 on each side of the opening 17 and serve to draw the tapered surfaces of the coupling member and the part 10 snugly together and prevent the leak of gas in the joint between them, the spring washer yielding or bending outwardly, as indicated in Fig. 1, to allow the members to be coupled tightly together.

To use the device, the coupling member is thrust into the opening in the plate 11 and engaged with the tapered end 10 of the gas cock and with the pin 26. A partial rotation of the coupling will open the cock and admit the gas to the drop light. The coupling cannot be removed from the cock as long as the gas passage is open. If it is desired to remove the coupling, it is rotated in the reverse direction, thereby closing the cock and adjusting the lugs to a position to register with the recesses 18 and 19 in the spring washer and thereupon the coupling may be removed.

The device may be made in various sizes and in various ways the details of construction may be modified and still be within the scope of my invention.

I claim as my invention:

1. The combination, with a service pipe, of a shell tapped therein and having ports in its walls, a gas cock fitting within said shell and having a passage therethrough positioned to register with the ports in said shell, said cock having a tapered outer end, a pin mounted in said cock and projecting laterally therefrom, a cap having an opening through which the tapered outer end of said cock projects, a coupling having a socket to receive said tapered outer end and a recess for said pin, said coupling also having laterally projecting lugs, and yielding means interposed between said lugs and said cap and engaged by said lugs when said coupling is rotated for drawing said coupling and cock together.

2. The combination, with a service pipe, of a shell tapped therein, a gas cock seated in said shell and having a passage to register with ports in said shell, a cap for the outer end of said service pipe and shell, a coupling having a tapered socket to receive the correspondingly shaped end of said cock, said cock and coupling having means for interlocking to rotate said cock when said coupling is revolved, a washer having cam surfaces interposed between the inner end of said coupling and said cap, and said coupling having means for engaging with said cam surfaces for drawing said coupling and cock together when rotated to expose said ports.

3. The combination, with a service pipe, of a shell tapped therein and provided with a flanged outer end and a recess encircled by said flange, a gas cock fitting within said shell and having a passage communicating with ports therein leading to said service pipe, a cap covering the outer end of said shell and having an opening therein through which said cock projects, a coupling having a socket to enter the opening in said cap and receive the end of said cock, said coupling and cock having means for interlocking with one another, a washer interposed between said cap and shell within said recess and provided with cam surfaces, means for preventing rotation of said washer, said coupling having means for engaging said cam surfaces for drawing it and said cock snugly together when said coupling is revolved.

In witness whereof, I have hereunto set my hand this 8th day of February 1916.

FRANK W. OLDS.